United States Patent

Pottick et al.

[11] Patent Number: 5,516,831
[45] Date of Patent: May 14, 1996

[54] SELECTIVELY SULFONATED BLOCK COPOLYMERS/EXTENDER OILS

[75] Inventors: Lorelle A, Pottick; Carl L. Willis; Richard Gelles, all of Houston, Tex.

[73] Assignee: Shell Oil Company, Houston, Tex.

[21] Appl. No.: 541,570

[22] Filed: Oct. 10, 1995

Related U.S. Application Data

[63] Continuation of Ser. No. 647,883, Jan. 30, 1991, abandoned.
[51] Int. Cl.$^6$ .............................. C08J 3/18; C08L 25/04
[52] U.S. Cl. ............................. 524/474; 524/529
[58] Field of Search .............. 525/98, 353; 524/474, 524/529

[56] References Cited

U.S. PATENT DOCUMENTS

| | | | |
|---|---|---|---|
| 3,485,787 | 12/1969 | Haetele et al. | 318/571 |
| 3,577,357 | 5/1971 | Winkler | 525/203 |
| 3,827,999 | 8/1974 | Crossland | 260/33.6 |
| 3,830,767 | 8/1974 | Condon | 260/28.5 B |
| 4,086,171 | 4/1978 | Wood et al. | 252/33 |
| 4,417,029 | 11/1983 | Milkovich | 525/314 |
| 5,002,997 | 3/1991 | Gelles et al. | 524/505 |

*Primary Examiner*—John C. Bleutoe
*Assistant Examiner*—D. Aylward
*Attorney, Agent, or Firm*—Keith M. Tackett

[57] ABSTRACT

Blends of a sulfonated thermoplastic block polymer and a compatible extender oil are described. The block copolymer is first selectively hydrogenated and thereafter modified by grafting sulfonic acid containing functional groups primarily in the alkenyl arene blocks. Neutralization of the acid groups to a metal salt is preferred to prepare oil extended blends that retain substantial amounts of non-extended mechanical properties.

8 Claims, No Drawings

SELECTIVELY SULFONATED BLOCK COPOLYMERS/EXTENDER OILS

This is a continuation of application Ser. No. 07/647,883, filed Jan. 30, 1991, now abandoned.

FIELD OF THE INVENTION

This invention relates to novel blends of a selectively sulfonated block copolymer and an extender resin. The block copolymer has a selectively hydrogenated conjugated diene polymer block and an alkenyl arene polymer block with sulfonic acid functional groups grafted primarily to the alkenyl arene blocks.

BACKGROUND OF THE INVENTION

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a selectively hydrogenated conjugated diene. The proportion of the thermoplastic blocks to the elastomeric polymer block and the relative molecular weights of each of these blocks is balanced to obtain a rubber having unique performance characteristics. When the content of the alkenyl arene Compound is small, the produced block copolymer is a so-called thermoplastic rubber. In such a rubber, the blocks A are thermodynamically incompatible with the blocks B resulting in a rubber consisting of two phases; a continuous elastomeric phase (blocks B) and a basically discontinuous hard, glass-like plastic phase (blocks A) called domains.

While in general these block copolymers have a number of outstanding technical advantages, one of their principal limitations lies in their sensitivity to oxidation. This behavior is due to the unsaturation present in the elastomeric section comprising the polymeric diene block. Oxidation may be minimized by selectively hydrogenating the copolymer in the diene block, for example, as disclosed in U.S. Pat. No. 27,145.

These selectively hydrogenated block copolymers are further deficient in many applications in which interactions are required between it and other materials. Applications in which improvements in adhesion characteristics may promote improved performance include 1) the toughening of, and dispersion in, polar polymers such as the engineering thermoplastics; 2) the adhesion to high energy substrates in a hydrogenated block copolymer elastomer based high temperature adhesive, sealant or coating material; and 3) the use of hydrogenated elastomers in reinforced polymer systems. The placement of functional groups onto the block copolymer provides interactions not possible with hydrocarbon polymers and, hence, extends the range of applicability of this material.

U.S. patent application Ser. No. 07/198,543 now abandoned, teaches that substantial improvement in the high temperature capabilities of the block copolymer can be obtained by the addition of sulfonic acid functional groups to the arene blocks, A, without substantially modifying the elastomeric B blocks. The high-temperature properties are improved by reacting the block copolymers with an acyl sulfate to add sulfonic acid functional groups in an all acid form. The sulfonic acid groups can be partially neutralized or totally neutralized with metal ions to form metal sulfonate salts. The acid and salt forms of the sulfonated block copolymers achieve excellant high temperature properties with a loss in processability. The processability of non-modified block copolymers is frequently improved by the addition of aliphatic hydrocarbon extender resins. However, typical aliphatic hydrocarbon resins have not been used with selectively sulfonated block copolymers and the effect on polymer properties could not be predicted.

SUMMARY OF THE INVENTION

According to the present invention, there is provided a blend of a selectively hydrogenated block copolymer of an alkenyl arene and a conjugated diene and an aliphatic hydrocarbon extender resin, the block copolymer having sulfonic acid functional groups grafted primarily to the alkenyl arene blocks. Each of the alkenyl arene block domains are preferably ionically crosslinked within the separate domain by neutralizing from 5 percent to 100 percent, more preferably at least 50 percent, and most preferably at least 90 percent, of the acid functional groups therein with metal ions of any positive valence.

The block copolymer preferably has at least two A blocks connected by a B block. Furthermore, the copolymer may be linear or branched, with the term "branched" also including symmetric or asymmetric radial and star structures.

The grafted acid functional group is preferably present at between about an average of one functional group per alkenyl arene block and about an average of one functional group per aromatic ring of the alkenyl arene block.

Preferably, there is provided a 10% to 75% blend of an aliphatic oil by weight in the functionalized, selectively hydrogenated block copolymer.

Most preferably, there is provided the functionalized selectively hydrogenated block copolymer as defined above, wherein (a) each of the A blocks prior to hydrogenation is predominately a polymerized monoalkenyl monocyclic arene block having an average molecular weight of about 1,000 to about 125,000, preferably 1,000 to 60,000, (b) each of the B blocks prior to hydrogenation is predominately a polymerized conjugated diene block having an average molecular weight of about 10,000 to about 450,000, preferably 10,000 to 150,000, (c) the A blocks constitute from 1 to 99 percent by weight of the copolymer, preferably 2 to 65 percent, (d) the unsaturation of the B blocks is less than 10 percent, preferably less than about 5 percent, of the original unsaturation of the B blocks, and more preferably at most 2 percent, (e) the unsaturation of the A blocks is greater than 50 percent, preferably greater than about 90 percent, of the original unsaturation of the A blocks, and (f) the sulfonic acid functional group is preferably present on the average from about one (1) of the acid groups per molecule of the copolymer to about one (1) of the acid groups per aromatic ring of the A blocks.

DETAILED DESCRIPTION OF THE INVENTION

Selectively Hydrogenated Block Copolymer Base Polymer

The block copolymers employed in the present composition are thermoplastic elastomers and have a least one alkenyl arene polymer block A and at least one elastomeric conjugated diene polymer block B. The number of blocks in the block copolymer is not of special importance and the polymer configuration may be linear or branched, which includes graft, radial or star configurations, depending upon the method by which the block copolymer is formed. The radial or star configuration may be either symmetric or asymmetric.

The A blocks are preferably monoalkenyl arene. The term "monoalkenyl arene" will be taken to include particularly those of the benzene series such as styrene and alpha-methylstyrene, and other monoalkenyl aromatic compounds such as vinyl naphthalene and the like. The preferred monoalkenyl arenes are styrene and alpha-methylstyrene, and styrene is particularly preferred.

The conjugated dienes are preferably ones containing from 4 to 8 carbon atoms. Examples of suitable such conjugated diene monomers include: 1,3-butadiene (butadiene), 2-methyl-1,3-butadiene (isoprene), 2,3-dimethyl- 1,3-butadiene, and 1,3-pentadiene (piperylene), preferably butadiene and isoprene. Mixtures of conjugated dienes may also be used.

The preferred base block copolymers have demonstrated utility in the present invention and have the structures:

polystyrene-hydrogenated polybutadiene-polystyrene (S-EB-S), and polystyrene-hydrogenated polyisoprene (S-EP), Preferably, the block copolymers of conjugated dienes and alkenyl arenes which may be utilized include any of those materials which have 1,2-microstructure contents prior to hydrogenation of from about 7% to about 100%, preferably from about 25 to about 65%, more preferably 35 to 55%. Such block copolymers may contain various ratios of conjugated dienes to alkenyl arenes. To exhibit elastomeric properties, the proportion of the alkenyl arene blocks in these block copolymers is between preferably about 2 and about 65 percent, and more preferably between about 5 and about 40 percent by weight. When the alkenyl arene content is not more than about 60 percent by weight, preferably not more than about 55 percent by weight, the precursor block copolymer has the characteristics of a thermoplastic elastomer. When the alkenyl arene content is greater than about 60 percent by weight, preferably more than about 70 percent by weight, the precursor block copolymer has the characteristics of a resinous polymer.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. These molecular weights are most accurately determined by gel permeation chromatography and/or low angle light scattering techniques.

The block copolymer may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,888 and 4,219,627. As is well known in the block copolymer art, tapered copolymer blocks can be incorporated in the multiblock copolymer by copolymerizing a mixture of monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356 the disclosures of which are incorporated herein by reference. Additionally, various patents describe the preparation of symmetric and asymmetric radial and star block copolymers including U.S. Pat. Nos. 3,231,635; 3,265,765; 3,322,856; 4,391,949; and 4,444,953; the disclosures of which patents are incorporated herein by reference.

Though the afore-mentioned illustrative patents are slanted to producing A—B—A block copolymers, other block copolymers of the present application may also be prepared by an obvious variation or modification of these procedures; for example, 1) sequential polymerization of an A-B or B—A—B block copolymer; 2) utilizing a di-initiator to prepare a B—A—B block copolymer; 3) utilizing polyfunctional coupling agents to couple B—A—Li living copolymer segments to form a $(B-A-)_n$—X polymer, where X is the residual portion of the polyfunctional coupling agent incorporated as part of the polymer whose presence therein is of insignificant effect to the properties of the resulting polymer and where n is the number of block copolymer segments or arms attached to X; and 4) similarly utilizing polyfunctional coupling agents to couple B—A—Li living copolymer segments and B-Li living homopolymer or diene copolymer segments to form a $(B-A-)_y$—X—(B) polymer, where X is as before and y and z represent the number of respective segments or arms attached to X.

These polymers and copolymers are preferably hydrogenated to improve polymer properties. The hydrogenation of these polymers and copolymers may be carried out by a variety of well established processes including hydrogenation in the presence of such catalysts as Raney Nickel, noble metals such as platinum, palladium and the like and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of less than 10 percent, preferably less than about 5 percent, and most preferably at most about 2 percent, of their original unsaturation content prior to hydrogenation as measured by ozone titration.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

Sulfonic Acid Functionalized Block Copolymers

The hydrogenated block copolymers described above are sulfonated primarily in the alkenyl arene blocks by reaction with a sulfonation reagent that selectively sulfonates the aklenyl arene blocks in preference to the hydrogenated polydiene blocks. Acyl sulfates exhibit the desired preference for sulfonation of the alkenyl arene blocks as discussed in U.S. patent application Ser. No. 07/198,543 now abandoned, which is incorporated by reference herein.

The structure of the substituted block copolymer specifically determined by the location of the sulfonic acid group ($-SO_3H$) on the alkenyl arene block gives the block copolymer a substantially greater degree of thermal stability.

It is presently believed that the addition of about one (1) sulfonic acid or sulfonate group per aromatic ring of the A blocks is limiting. Preferably, the functionality level is on the average from about one (1) functional group per molecule of the copolymer to about one functional group per aromatic ring of the A block, and more preferably on the average from about three (3) functional groups per molecule of the copolymer to about one (1) functional group per two aromatic rings of the A block.

Preferred sulfonation reagents for preparing the sulfonated block copolymers described herein are "acyl sulfates". The preparation and characterization of acyl sulfates is described in "Sulfonation and Related Reactions", E. E. Gilbert, Robert E. Krieger Publishing Co., Inc., Huntington, N.Y., pp 22, 23, and 33 (1977) (First edition published by John Wiley & Sons, Inc (1965)). Acetyl sulfate is the most preferred sulfonation reagent. Acetyl sulfate ($CH_3-CO-O-SO_3H$) is capable of sulfonating itself to produce sulfoacetic acid ($HSO_3-CH_2-CO-OH$), and should be prepared fresh before each sulfonation reaction or prepared in situ by the reaction of acetic anhydride with sulfuric acid.

Neutralization of Sulfonated Block Copolymer

The sulfonic acid functional groups in the A blocks of the block copolymers of the present invention are preferably "neutralized" by reacting the sulfonated block copolymer with an ionizable metal compound to obtain a metal salt. The reaction mechanism involved in the formation of the ionic A block domains and the exact structure of these ionic clusters within the respective domain is not completely understood at the present time. However, it is believed that increased high temperature properties of these ionic copolymers are the result of an ionic attraction between the metal ion and one of more ionized acid functional groups in the A block domains.

This ionic attraction results in a form of crosslinking which occurs in the solid state. However, when molten and subjected to the shear stresses which occur during melt fabrication, the ionic crosslinks with these A blocks of the copolymers of the present invention weaken and the polymer exhibits melt fabricatability. Moreover, these ion containing block copolymers are readily soluble in polar solvents and may be processed easily from solution. During cooling of the melt or during solvent evaporation, the ionic crosslinks are reformed or strengthened as the modified block copolymer solidifies and again exhibits the properties of a crosslinked material.

The improvement in the mechanical properties and deformation resistance resulting from the neutralization of the ionic A block domains is greatly influenced by the degree of neutralization and, therefore, the number of the ionic crosslinks and the nature of the crosslink involved. As earlier noted, an improvement in these properties over that of the unmodified block copolymer occurs when the acid functional groups are added to the block copolymer. A further enhancement in properties results as the degree of neutralization of the acid groups increases from 0 percent to 100 percent of total functionality content. Thus, as the degree of acid functionality and metal salt content are independently or jointly increased, a greater improvement in the high temperature properties of the modified block copolymer is observed. This phenomena is true so long as the acid functionalized block copolymer remains processable from the solution or melt state. Additionally, the viscosity index improvement produced by these polymers in lubricants and the like is also enhanced and rendered more stable as a result of these ionic attractions.

The metal ions which are suitable in forming the neutralized block copolymers of the present invention are positive valent ions of metals, preferably mono-, di- and trivalent ions of metals in Groups IA, IB, IIA, IIB, IIIA, IIIB, and VIII, of the Periodic Table of Elements. These metal ions can be complexed or uncomplexed, and can be used alone or in any mixture thereof. Suitable monovalent metal ions are $Na^+$, $K^+$, $Li^+$, $Cs^+$, $Ag^+$, $Hg^+$ and $Cu^+$. Suitable divalent metal ions are $Mg^{+2}$, $Ca^{+2}$, $Sr^{+2}$, $Ba^{+2}$, $Cu^{+2}$, $Cd^{+2}$, $Hg^{+2}$, $Sn^{+2}$, $Pb^{+2}$, $Fe^{+2}$, $Co^{+2}$, $Ni^{+2}$, and $Zn^{+2}$. Suitable trivalent metal ions are $Al^{+3}$, $Sc^{+3}$, $Fe^{+3}$, $La^{+3}$, and $Y^{+3}$. Preferable compounds are hydroxides, oxides, alcoholates, carboxylates, formates, acetates, methoxides, ethoxides, nitrates, carbonates and bicarbonates of the above-referenced metal ions.

The degree of functionalization and of neutralization may be measured by several techniques. For example, infrared analysis or elemental analysis may be employed to determine the overall degree of functionality. Additionally, the titration of a solution of the block copolymer with a strong base may be utilized to determine the degree of functionality and/or the degree of neutralization (metal salt content). Neutralization as used herein is based on the percentage of metal salt ions as compared to the total acid and metal salt functionality.

In general, it was found that the added metal ions react approximately stoichiometrically with the acid functional groups (acid form) in the polymer up to about 95 percent neutralization. Thereafter, excess quantities of the metal compound are necessary to carry the neutralization to completion. However, in some instances, an excess of the neutralizing agent may be desirable.

The block copolymers, as modified, may still be used for any purpose for which the unmodified material (base polymer) was formerly used. That is, they may be used for adhesives and sealants, as modifiers for lubricants, fuels and the like, or compounded and extruded and molded in any convenient manner.

The desired degree of neutralization may be achieved by various methods. If the modified block copolymer is in an all acid form or in a partially neutralized form and additional neutralization is desired, neutralization is preferably carried out under conditions which allow for a homogeneous uniform distribution of the metal compound in the modified block copolymer. No particular reaction conditions are essential except that the conditions should preferably permit the removal of the neutralization product. More specifically, the neutralization reaction is preferably carried out either (1) by adding the metal compound, directly or in solution, to a solution of the modified block copolymer and then, on neutralization, precipitating and separating the resulting polymer; or (2) by melt blending the block copolymer with the metal compound. The melt blending is preferably conducted at elevated temperatures to facilitate homogeneous distribution of the metal compound and to volatize the neutralization product.

Alternatively, if the modified block copolymer is in an all neutralized salt form or in a partially neutralized form and additional acidification (i.e., reverse-neutralization) is desired, acidification is likewise preferably carried out under conditions which allow for a homogeneous uniform distribution of the acid in the modified block copolymer. The acid utilized is preferably a mineral acid such as sulfuric acid or hydrochloric acid. The resulting metal-salt acidification product is not believed to be harmful to the resulting modified block copolymer. However, the metal salt may be removed by conventional means if so desired.

As an additional alternative, the all acid and the all neutralized salt forms of the block copolymer may be blended with each other, by either the solution or melt blending method mentioned above, to achieve the desired degree of neutralization. It is to be understood, however, that the specific technique employed is not critical as long as it meets the requirements set forth above. The extent of the neutralization, i.e., the degree to which the metal ion is linked with the sulfonate ion may be readily analyzed by titration methods.

It is not essential that the metal compound be added as such, but it is possible to form the metal compound in situ from components which react with each other in the desired manner in the polymer environment. Thus, it is possible to add a metal oxide to the acid or partially neutralized block copolymer then add an acid such as acetic acid in the proper proportion and form the metal compound, i.e., the metal acetate, while the polymer is milled. The metal compound then neutralizes the block copolymer to the desired degree depending on the proportion of metal compound formed.

Copolymer Blends

The polymer compositions of the present invention can also contain thermoplastic polymers which are not reactive with the modified block copolymer, and which are preferably non-polar, such as styrene polymers and olefin polymers, as a separate phase therein. These thermoplastic polymers can optionally be incorporated into the present polymer compositions to improve the processability of the composition without substantially detracting from the essential character of the modified block copolymer therein. The amount of the non-reactive thermoplastic polymer is preferably 100 parts by weight or less, more preferably 1 to 50 parts by weight, based on 100 parts by weight of the modified block copolymer.

The styrene polymers are polymer substances containing 50% by weight or more of styrene, such as polystyrene, styrene-α-methylstyrene copolymers, butadiene-styrene block copolymers and hydrogenated derivatives thereof, isoprene-styrene block copolymers and hydrogenated derivatives thereof, rubber modified high impact polystyrene, and mixtures thereof.

The olefin polymers are polymer substances containing 50% by weight or more of an olefin monomer unit containing ethylene, propylene, butene and the like. Typical examples of such polymers are low-density polyethylene, high density polyethylene, polypropylene, polybutene, ethylene-propylene copolymers and the like, including mixtures thereof.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

Block Copolymer/Extender Resin Blends

The selectively sulfonated block copolymers described above exhibit improved processing and mechanical capabilities when blended with an aliphatic hydrocarbon extender resin in comparison to conventional block copolymer/extender resin blends. The extender resins are compatible with the polybutadiene blocks and not the alkenyl arene blocks. The block copolymers can be combined with the extender resin in any desired ratio of resin to block copolymer. Preferred blends, having resin to block copolymer ratios of 3:1 to 1:1, have good combiantions of processability and tensile strength as shown in the examples that follow.

The extender resins blended with the block copolymers have the chief advantage of substantially reducing the cost of the composition with less than expected reductions in tensile strength. The resins must be chosen with care to coordinate with the block copolymer relative to the compatibility with the several polymer blocks present therein. The resin should be one which is substantially compatible with homopolymers of conjugated dienes but which is substantially incompatible with homopolymers of the non-elastic (thermoplastic) terminal blocks. Compatibility can be determined by the following type of test:

A resin to be tested is mixed in several proportions (e.g., 5, 50, 100 phr.) with the type of block copolymer of interest and a thin film is prepared. Suitability of the resin for use as an extender is judged by the tensile strengths of the resin-containing polymer films determined in pounds per square inch by an appropriate testing instrument and by the appearance of the film surface. Excessive compatibility with the terminal polymer segments will cause severe loss of tensile strength, greater than that resulting from simple dilution of the polymer. Excessive incompatibility will be evidenced by diffusion of the resin to the film surface.

The extender resins typified by the above requirements are aliphatic hydrocarbons, including aliphatic waxes and aliphatic oils, which may contain up to about 10% aromatic hydrocarbons by Clay-Gel Analysis, although aromatic carbons are essentially absent by carbon-type analysis. Conventional aliphatic waxes and aliphatic oils are similar except that the waxes have fewer side chains resulting in higher crystallinity. KAYDOL® Oil, available from Witco Chemical Co. has worked well.

The compositions are preferably prepared by subjecting mixtures of the acid functionalized, hydrogenated block copolymer and at least a portion of the aliphatic hydrocarbon resin to mixing conditions at temperatures (50°–250° C.) suitable for expediting dispersion of the block copolymer in the resin. Although it is undesirable economically if it can be avoided, solution methods may be employed, namely, dispersion of the block copolymer in a relatively volatile solvent such as cyclohexane, addition of the aliphatic hydrocarbon resin to the solution and evaporation of the volatile solvent.

The blends of the present invention may be prepared by melt blending or solution blending the desired proportion of resin ranging from about 1–75 percent with the desired proportion of the modified block copolymer ranging from about 25 percent to about 99 percent. Taking economic and commercial considerations into account, the amount of resin preferably ranges from about 10% to about 75% and most preferably from about 25% to 75% of the resin/block copolymer blend.

EXAMPLES

To assist those skilled in the art in the practice of this invention, the following Examples are set forth as illustrations. It is to be understood that in the specification and ;claims herein, unless otherwise indicated, when amounts are expressed in terms of percent by weight, it is meant percent by weight based on the block copolymer.

It is to be understood that in the tables that follow where reference is made to "counterion" only the metal counterion will be listed with respect to the partially neutralized modified block copolymers with the hydrogen counterion relating to the remaining acid functionality being implied.

Per the following examples, the base block copolymer was first modified to varying degrees ! of sulfonate group functionality (content) by reacting acetyl sulfate with the polystyrene blocks. The modified block copolymers were then further modified with sodium, zinc, lead, and cobalt ions to form sulfonate salts at various acid to sulfonate salt contents (degree of neutralization).

Tensile measurements were made on a micro-tensile specimen cut from compression molded films on an Instron Universal Testing Machine. A crosshead speed of 0.5 inches/minute was employed over an initial gauge length of one inch.

In general, the sulfonated polymers were difficult to mold; the difficulty increased with increasing sulfonation. At the higher sulfonate levels, it was difficult to make good films. Compression molded films possessed a high level of molded-in stresses. Annealing the molded films overnight in a vacuum oven near the glass transition temperature between spring loaded parallel plates was adequate for relieving the bulk of the residual stresses. If this was not done, the samples shrank at elevated temperatures. These observations can be attributed to the network formed by the ionic associations since this problem did not occur for the non-sulfonated block copolymer.

of 7,700–36,000–7,700 and a styrene content of 30% by weight, was dried in a vacuum oven at 70° C. for 48 hrs to remove traces of water. An aliquot of the dried polymer (10g) was dissolved in EDC (100 ml) in a closed vessel and the solution was heated to 50° C. The sample was sparged with nitrogen for 30 minutes to remove atmospheric oxygen. Sulfonation was initiated by the addition of 6 ml (6 mmol) of the 1.0M standard acetyl sulfate solution. After 2 hours, the reaction was terminated by addition of a quenching agent, 2-propanol (10 ml). The sulfonic acid modified block copolymer was isolated by a steam stripping technique. The crude product was purified by washing in boiling water for 2 hours. Purified polymer was recovered by filtration. The filter cake was washed with absolute ethanol and vacuum dried at 50° C. for 5 days. A quantitative yield of modified polymer was recovered.

Elemental analysis of an aliquot of the modified polymer found 1.04% wt sulfur (11.7 mol % sulfonic acid based on the styrene content of the polymer (i.e. 11.7 —$SO_3H$ sites per 100 styrene units in the block copolymer)). The theoretical yield for this reaction was 21 mol % sulfonic acid based on the styrene content of the polymer. On the basis of elemental analysis results, about 564 of the $H_2SO_4$ used in preparing the acetyl sulfate charge resulted in forming polymer bound sulfonic acid sites in the modified polymer.

A second aliquot of the modified polymer was analyzed for sulfonic acid content using a titration technique. In this analysis, an accurately weighed sample of the purified sulfonated polymer (about 0.1 g) was dissolved in 50 ml of a toluene/methanol (90/10, v/v) solution. Nitrogen was bubbled through the solution for 30 minutes to purge the sample of dissolved $CO_2$. Titration to a phenolphthalein endpoint using 0.02N NaOH in methanol found 11.9 mol % sulfonic acid based on the styrene content of the polymer. This result was in good agreement with the value found by elemental analysis, 11.7 mol %.

Using this reaction procedure with varying levels of sulfonation reagent, of sulfonic acid modified polymer having 5.2 mol % sulfonic acid was synthesized from the base block copolymer. These products correspond to Polymers A and B in Table 1.

TABLE 1

| Sulfonated Block Copolymer | Sulfonic Acid Functionality (mol % basis styrene) | Ratio of Sulfonic Acid Groups to Alkenyl Arene Units in Block Copolymer | Sulfonic Acid Groups/Molecule of Block Copolymer |
|---|---|---|---|
| A | 5.2 | 1/19 | 7.5 |
| B | 11.9 | 1/8 | 17 |

EXAMPLE 1

Sulfonation of a Styrene-Hydrogenated Butadiene-Styrene Triblock Copolymer (Preferred Method)

In this experiment, a standard solution of acetyl sulfate was prepared by treating 7.6 ml (81 mmol) of acetic anhydride in 40 ml of 1,2-dichloroethane (EDC) at 10° C. with 2.8 ml (50 mmol) of 95% sulfuric acid ($H_2SO_4$). A clear solution resulted. The solution was presumed to be 1.0M in acetyl sulfate.

A styrene-hydrogenated butadiene-styrene (S-E/B-S) block copolymer, having weight average molecular weights

EXAMPLE 2

Neutralized Modified Block Copolymers

In this example, sulfonated block copolymers were neutralized utilizing monovalent metal counterions of sodium ($Na^{1+}$) and divalent metal counterions of zinc ($Zn^{2+}$). The neutralized modified block copolymers were obtained by adding aqueous sodium hydroxide or zinc acetate solutions to the sulfonated block copolymer (all acid) in toluene respectively.

Table 2 indicates the various neutralized block copolymers produced from the corresponding sulfonated block copolymers for purposes of the following examples.

TABLE 2

| Sulfonated Block Copolymer | Precurser All Acid Block Copolymer | Sulfonic Acid Functionality mol % | Metal Counterion[a] |
|---|---|---|---|
| C | A | 5.2 | Na$^+$ |
| D | A | 5.2 | Zn$^{++}$ |
| E | B | 11.9 | Na$^+$ |
| F | B | 11.9 | Zn$^{++}$ |

[a]Assumed to be 100% neutralized.

EXAMPLE 3

Effect of Oil Addition and Degree of Neutralization on Tensile Strength

In this example, the tensile strength at break of compression molded films of the base block copolymer and the sulfonated block copolymer with varying amounts of sulfonate functionality were measured with and without the addition of an equal amount by weight of KAYDOL® Oil.

As depicted in Table 3, sulfonation of the block copolymer without the aliphatic hydrocarbon resin present results in an enhancement of elevated temperature properties with minimal effects on the room temperature properties. With the addition of the resin, there is a corresponding decrease in properties for both the sulfonated block copolymer and the base polymer at each testing temperature. However the % retention of tensile strength increases with increasing sulfonation levels when the block copolymer is extended. This effect is further amplified when the hydrogen counterion is replaced by a metal counterion.

This example demonstrates the uniqueness of the aliphatic hydrocarbon extended compound in block copolymers containing acid functionality in the arene segment.

TABLE 3

| | Functionality | Tensile Strength, psi | | Extended Sample % Retention of Tensile Strength | |
|---|---|---|---|---|---|
| Sample | mole % | RT | 100° C. | RT | 100° C. |
| Base Polymer | — | 4140 | 150 | — | — |
| Base/Oil (50/50) | — | 155 | 18 | 4 | 12 |
| A | 5.2%-SO$_3$H | 4100 | 175 | — | — |
| A/Oil (50/50) | 5.2%-SO$_3$H | 250 | 30 | 6 | 17 |
| C | 5.2%-SO$_3$Na | 4000 | 180 | — | — |
| C/Oil (50/50) | 5.2%-SO$_3$Na | 190 | 35 | 5 | 19 |
| D | 5.2%-SO$_3$Zn | 4080 | 250 | — | — |
| D/Oil (50/50) | 5.2%-SO$_3$Zn | 210 | 34 | 5 | 14 |
| B | 11.9%-SO$_3$H | 4000 | 380 | — | — |
| B/Oil (50/50) | 11.9%-SO$_3$H | 400 | 38 | 10 | 10 |
| E | 11.9%-SO$_3$Na | 4050 | 430 | — | — |
| E/Oil (50/50) | 11.9%-SO$_3$Na | 55[a)] | 22[a)] | 1 | 5 |
| F | 11.9%-SO$_3$Zn | 4100 | 490 | — | — |
| F/Oil (50/50) | 11.9%-SO$_3$Zn | 460 | 115 | 11 | 23 |

[a)]Very sticky films.

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A thermoplastic composition, comprising a blend of 10% to 75% by weight of an aliphatic hydrocarbon oil and 90% to 25% by weight of functionalized, selectively hydrogenated block copolymer to which has been grafted sulfonic functional groups, the block copolymer having
   (a) at least one alkenyl arene polymer block A and
   (b) at least one substantially completely, hydrogenated conjugated diene polymer block B,
   (c) wherein substantially all of the sulfonic functional groups are grafted to said copolymer on said A block, and
   (d) wherein the composition retains from 10% to 11% of the tensile strength of the block copolymer at room temperature.

2. The composition according to claim 1, wherein said copolymer has at least two alkenyl arene blocks A that are connected by a hydrogenated diene polymer block B.

3. The composition according to claim 1, wherein at least 50 percent of the sulfonic functional groups are present as zinc salts.

4. The composition according to claim 1, wherein the residual ethylenic unsaturation of the polymerized conjugated diene blocks is at most 2 percent of the ethylenic unsaturation present prior to hydrogenation.

5. The composition according to claim 1, wherein at least about 90% of the sulfonic functional groups are present as zinc sulfonates.

6. The composition according to claim 2, wherein the copolymer is an A—B—A polymer.

7. The composition according to claim 13, wherein the A—B—A polymer is a polystyrene-hydrogenated polybutadiene-polystyrene polymer.

8. The composition according to claim 1, where diene polymer block B has a 1,2-microstructure from 35 to 55%.

* * * * *